(12) United States Patent
De Vita et al.

(10) Patent No.: US 8,980,152 B2
(45) Date of Patent: Mar. 17, 2015

(54) METHOD OF MANUFACTURING AN INTEGRAL PROFILE MONOLITHIC WING STRUCTURE

(75) Inventors: Vincenzo De Vita, Andria (IT); Sabato Inserra Imparato, Gragnano (IT); Giovanni Lanfranco, Villanova d'Asti (IT); Nicola Miani, Andria (IT); Giovanni Sagnella, Benevento (IT); Massimo Riccio, Caserta (IT)

(73) Assignee: Alenia Aeronautica S.p.A., Pomigliano d'Arco, Naples (IT)

( * ) Notice: Subject to any disclaimer, the term of this patent is extended or adjusted under 35 U.S.C. 154(b) by 726 days.

(21) Appl. No.: 12/668,645

(22) PCT Filed: Jun. 30, 2008

(86) PCT No.: PCT/IB2008/052621
§ 371 (c)(1),
(2), (4) Date: Jan. 11, 2010

(87) PCT Pub. No.: WO2009/007873
PCT Pub. Date: Jan. 15, 2009

(65) Prior Publication Data
US 2010/0193636 A1    Aug. 5, 2010

(30) Foreign Application Priority Data

Jul. 11, 2007  (IT) .............................. TO2007A0507

(51) Int. Cl.
*B29C 65/70*       (2006.01)
*B29C 70/34*       (2006.01)
(Continued)

(52) U.S. Cl.
CPC ............. *B29C 70/345* (2013.01); *B29C 66/721* (2013.01); *B29C 70/543* (2013.01);
(Continued)

(58) Field of Classification Search
CPC ................................ B29C 65/70; B29C 70/44
USPC ....................................................... 264/258
See application file for complete search history.

(56) References Cited

U.S. PATENT DOCUMENTS 5,493,390 A    2/1996  Varasi et al.
5,688,353 A   11/1997  Dublinski et al.
(Continued)

FOREIGN PATENT DOCUMENTS

DE    1 275 279     8/1968
EP    0582 160 A1   2/1994
(Continued)

OTHER PUBLICATIONS

Campbell "Manufacturing processes for advanced composites." Elsevier, Oxford, UK, XP002501719, ISBN: 1-8561-7415-8, pp. 290-298.

*Primary Examiner* — Larry Thrower
*Assistant Examiner* — Xue Liu
(74) *Attorney, Agent, or Firm* — Merchant & Gould P.C.

(57) ABSTRACT

A method of manufacturing a wing structure includes laying a plurality of layers of preimpregnated material on a first mould half and on a second mold half so as to form a first fresh skin and a second fresh skin of the wing structure. A plurality of layers of preimpregnated material are laid in succession on a shaped apparatus to form a fresh leading edge skin of the wing structure. Fresh spars of preimpregnated material are formed. A wedgelike body of expanded plastics material is formed, this body being designed to be interposed between the first and second skins at the trailing edge of the wing structure. The fresh spars are positioned in a coordinated way on the first fresh skin, removable support members also positioned next to the spars. The second mold half is turned over on to the first mold half so as to position the second fresh skin on the spars and the supports, to produce a fresh wing structure. The fresh wing structure is subjected to a polymerization cycle, using a vacuum bag.

4 Claims, 8 Drawing Sheets

(51) Int. Cl.
*B29C 65/00* (2006.01)
*B29C 70/54* (2006.01)
*B64C 3/24* (2006.01)
*B29C 35/08* (2006.01)
*B29K 63/00* (2006.01)
*B29K 105/24* (2006.01)
*B29K 707/04* (2006.01)
*B29L 31/30* (2006.01)
*B29L 31/60* (2006.01)

(52) U.S. Cl.
CPC ............ *B64C 3/24* (2013.01); *B29C 66/81455* (2013.01); *B29C 2035/0822* (2013.01); *B29K 2063/00* (2013.01); *B29K 2105/246* (2013.01); *B29K 2707/04* (2013.01); *B29L 2031/3085* (2013.01); *B29L 2031/608* (2013.01); *Y02T 50/433* (2013.01); *Y02T 50/43* (2013.01)
USPC ........................................................ 264/258

(56) References Cited

U.S. PATENT DOCUMENTS

| | | |
|---|---|---|
| 6,190,484 B1 | 2/2001 | Appa |
| 6,743,504 B1 | 6/2004 | Allen et al. |
| 2001/0017336 A1* | 8/2001 | Hirahara et al. ............... 244/123 |
| 2006/0249626 A1* | 11/2006 | Simpson et al. ............ 244/123.1 |

FOREIGN PATENT DOCUMENTS

| | | |
|---|---|---|
| FR | 2 555 501 | 5/1985 |
| WO | WO 95/24614 | 9/1995 |
| WO | WO 2004/000643 A2 | 12/2003 |

* cited by examiner

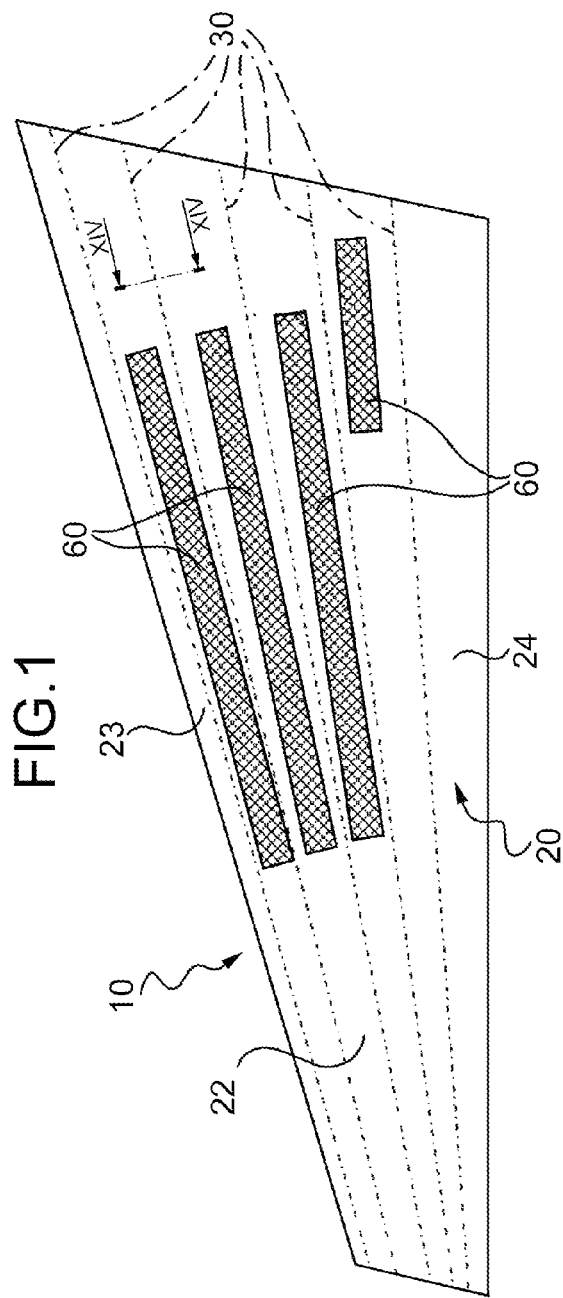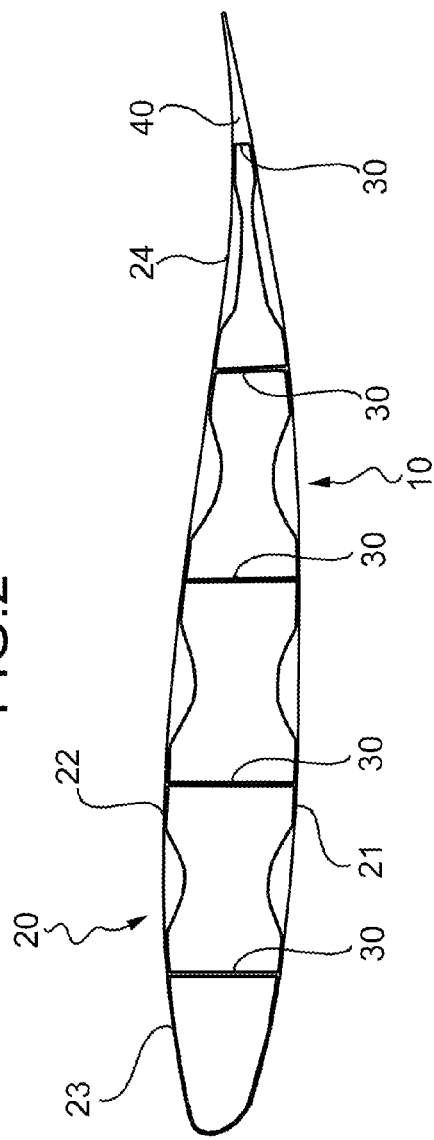

METHOD OF MANUFACTURING AN INTEGRAL PROFILE MONOLITHIC WING STRUCTURE

This application is a National Stage Application of PCT/IB2008/052621, filed in 30 Jun. 2008, which claims benefit of Serial No. TO2007A000507, filed 11 Jul. 2007 in Italy and which applications are incorporated herein by reference. To the extent appropriate, a claim of priority is made to each of the above disclosed applications.

BACKGROUND OF THE INVENTION

The present invention relates to a method of manufacturing a wing structure.

An example of a method of this type is described in EP 0 582 160. The purpose of this method is to construct structural components of composite material, using as the initial material a fibre material such as glass or carbon fibre preimpregnated with a thermosetting resin. This preimpregnated material is deposited in layers on lay-up apparatuses which are shaped according to the requirements of the process. In particular, EP 0 582 160 describes a method for manufacturing monolithic box structures in which panels of preimpregnated material which is fresh, in other words non-polymerized, are assembled together by means of reinforcing elements, or spars, also made from fresh preimpregnated material, and the structure formed in this way inside a shell structure (i.e. in a closed mould) is subsequently introduced into an autoclave for the cycle in which the resin of the preimpregnated material is polymerized.

This method is suitable for the manufacture of wing structures such as the central box of a multi-spar wing. The leading edge and the trailing edge of the wing structure are subsequently attached mechanically.

A method of this type reduces the number of mechanical assembly operations, thus reducing the production cost and the weight added by mechanical connecting members, and can provide an aerodynamic surface which is clean (in other words, free of connecting members). Furthermore, the risks associated with the fatigue of the structure and corrosion during operation, due to the presence of metallic parts, are reduced in a part produced by this method.

WO 2004/000643 A and U.S. Pat. No. 6,743,504 B1 disclose known manufacturing methods.

SUMMARY OF THE INVENTION

The object of the present invention is to provide a method for manufacturing a monolithic wing structure in which the number of mechanical assembly operations is reduced further, in order to maximize the advantages described above.

The invention therefore proposes a method for manufacturing a wing structure.

This method can be used to make panels, spars (without intermediate ribs), leading edges and trailing edges of composite material into a monolithic unit by a process of polymerizing the entire structure in a closed mould. This produces an integral profile wing structure, in other words one formed by a multi-spar load-bearing box with an integrated leading edge and trailing edge. This reduces to a minimum all operations relating to the mechanical assembly of these elements, with consequent advantages in terms of production costs and weight. Furthermore, the drastic reduction in connecting members, and the integration of the box structure, leading edge and trailing edge in an apparatus which accurately determines the profile, significantly reduces the drag and probably the radar signature of the component.

The invention also proposes a wing structure produced by the method according to the invention.

BRIEF DESCRIPTION OF THE DRAWINGS

Some preferred, but non-limiting, embodiments of the invention will now be described, with reference to the appended drawings, in which:

FIG. 1 shows a simplified plan view of a winglet structure made by the method according to the invention;

FIG. 2 shows a simplified sectional view of the structure of FIG. 1;

DETAILED DESCRIPTION OF THE PREFERRED EMBODIMENTS

Figure 3:
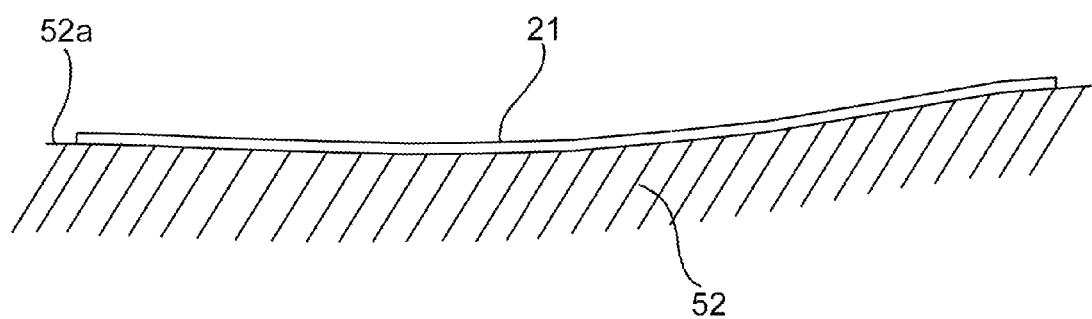
FIG. 3 shows a simplified sectional view of a lower surface skin portion of the structure of FIG. 1, laid on an upper mould half.
Figure 4:
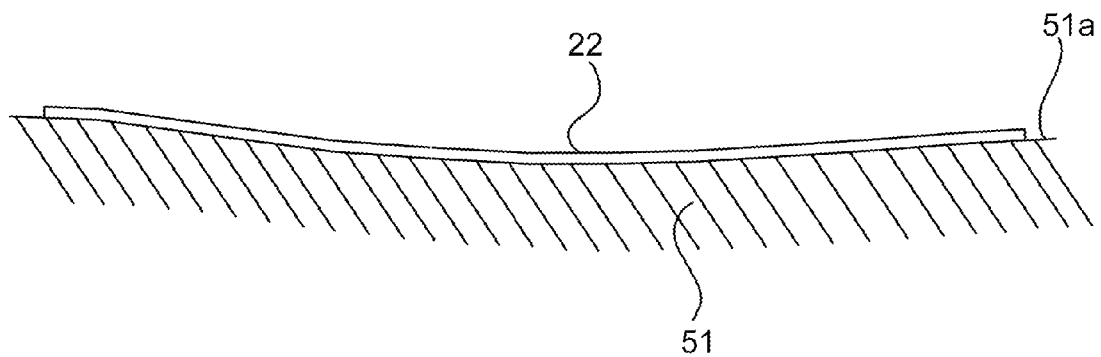
FIG. 4 shows a simplified sectional view of an upper surface skin portion of the structure of FIG. 1, laid on a lower mould half.

FIGS. 1 and 2 show a wing structure 10 produced by the method according to the invention. For the purposes of the present invention, the term "wing" denotes any aerodynamic element in the shape of a wing, for example an actual wing, a stabilizer, a winglet, a rudder or the like.

For the sake of simplicity, however, reference will be made to a winglet in the remainder of the description. The winglet structure 10 therefore comprises an outer skin 20, formed by a lower surface skin portion 21, an upper surface skin portion 22 positioned above it, and a leading edge portion 23 and a trailing edge portion 24 which interconnect the lower surface skin portion 21 and the upper surface skin portion 22 at their ends, thus forming the profile of the structure 10.

The winglet structure 10 is of the multi-spar type, and therefore also comprises a plurality of spars 30, which extend in the direction of extension of the structure 10 and interconnect the lower surface skin portion 21 and the upper surface skin portion 22 in order to form a box structure.

At the position of the trailing edge skin portion 24, the lower surface skin portion 21 and the upper surface skin portion 22 are interconnected by a wedgelike body 40 of expanded plastics material.

The whole outer skin 20 and the spars 30 are produced by joining layers of preimpregnated material, using procedures which are specified below. Preferably, the preimpregnated material has a matrix of epoxy resin reinforced with carbon fibres. For the purposes of the invention, the term "preimpregnated material" denotes in a conventional way a semi-finished product comprising reinforcing fibres and a resin matrix in which these fibres are embedded. The fibres can be positioned in different configurations, for example in a unidirectional layer, in two layers having different orientations from each other, or in the form of a textile. The preimpregnated materials are generally prepared in tape form and wound in reels.

The preimpregnated material is therefore cut beforehand to the requisite size for the preparation of the various components of the structure 10.

Figure 13:
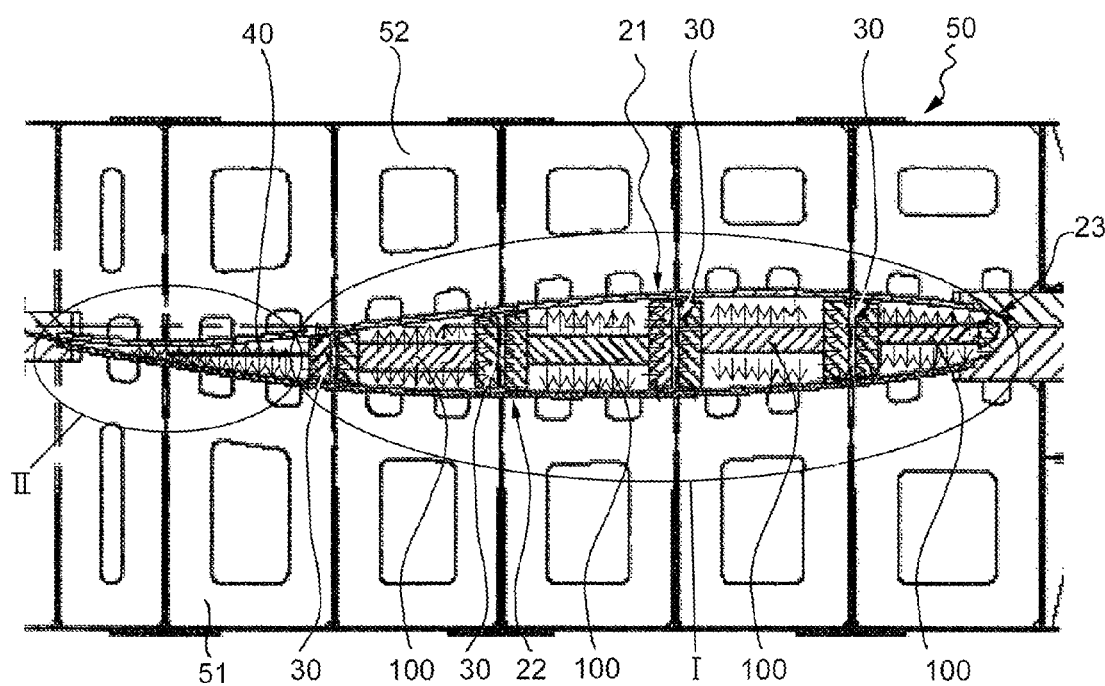
FIG. 13 shows the structure of FIG. 1 in a mould which has been closed for a polymerization cycle.

FIGS. 3, 4, 7 and 13 show an apparatus of the shell type 50, comprising a first and a second mould half 51 and 52 for manufacturing the structure 10. In the stage in which the preimpregnated material is deposited, the second mould half 52 is positioned so that it faces upwards, as shown in FIG. 3. For the subsequent polymerization stage, the second mould half 52 is turned over and positioned on top of the first mould half 51, as shown in FIG. 13. In particular, the joining line of the moulds 51 and 52 must be precise enough not to have any discontinuities; this results in a controlled aerodynamic surface free of any steps. The shell apparatus 10 is constructed according to the teachings of patent EP 0 582 160 mentioned at the start of the present description.

The mould halves 51 and 52 are shaped so as to impart the desired profile to the material which is laid on them, and therefore they have corresponding mould surfaces 51a and 52a which reproduce the desired shape to be imparted, respectively, to the upper surface skin portion 22 and to the lower surface skin portion 21.

The mould halves 51 and 52, and particularly the mould surfaces 51a and 52a, are designed in a conventional way to be used, in a clean room in controlled temperature and humidity conditions, for the successive deposition (laying-up) of a plurality of layers of preimpregnated material so as to produce a stratified structure. Specifically, the upper surface skin portion 22 is formed on the mould surface 51a, while the lower surface skin portion 21 is formed on the other mould surface 52a.

The mould surfaces 51a and 52a must therefore be treated with a release agent or must be coated with a release film, to facilitate the separation of the finished piece from the mould surfaces 51a and 52a at the end of the polymerization cycle.

In order to reduce the weight to a minimum while maximizing stiffness, the lower surface skin portion 21 and upper surface skin portion 22 are formed in such a way as to provide a sandwich configuration, with a core formed by stiffening elements 60 of material with a honeycomb structure, shown in FIGS. 1, 5 to 7, and 14. Preferably, the honeycomb material is made from Nomex®, for example the HRH-10 product made by Hexcel Corp., Stamford, Conn., USA.

Figure 5:
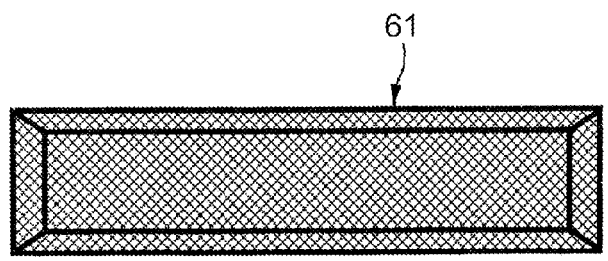
FIG. 5 shows a simplified plan view of a stiffening element with a honeycomb cell structure of the skin of the structure of FIG. 1.
Figure 6:
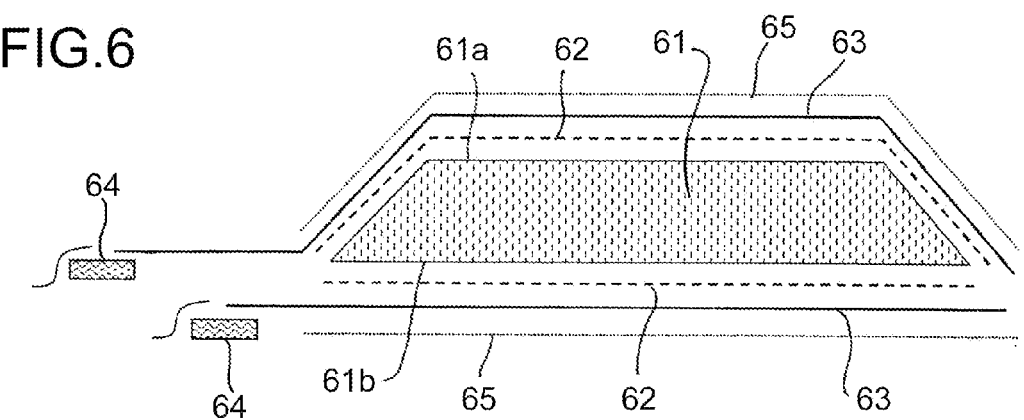
FIG. 6 is a schematic sectional view showing the stiffening element of FIG. 5 at a preparatory stage.

FIG. 1 shows the arrangement of the stiffening elements 60 in the lower surface skin 21 and in the upper surface skin 22. These elements 60 are positioned in the areas subject to the greatest load. In the illustrated example, the stiffening elements 60 have different sizes, are four in number, and are interposed, on a plan view, between adjacent spars 30. The stiffening elements 60 are produced by machining the honeycomb material so as to obtain a body 61 as shown in FIG. 5, with a trapezoidal cross section.

Since the Nomex® honeycomb material forming the stiffening elements 60 would not be able to withstand the pressures used in the final polymerization cycle of the structure 10, it is subjected to a preliminary stabilization process. This stabilization process forms a sandwich structure, shown in FIG. 6, in which a film of epoxy adhesive 63, a layer of preimpregnated carbon fibre textile 62 and a layer of peelable textile 65 are deposited on the upper face 61a and lower face 61b of the body 61.

This sandwich structure is subject to a stabilizing polymerization cycle in an autoclave with a vacuum bag, to stabilize the adhesion of the preimpregnated carbon fibre textile layers 62 to the honeycomb body 61. In one example of a suitable cycle for the aforementioned materials, the sandwich is kept at a temperature of 180° C. and at a pressure of 3 bars for 60-90 minutes.

The preparation of the sandwich structure for the polymerization/stabilization structure also includes, in a conventional way, the bonding of the carbon fibre textile layers 62 to the lay-up apparatus (not shown), using strips of perimetric ventilating material (dry glass fibre) 64, and the application of external peelable textile layers 65. Clearly, this bonding can be carried out by alternative procedures, for example by the "grit strip" (bonding strip) procedure in which metal strips are fixed to the mould, the surfaces of these strips having rough areas to which the preimpregnated fabrics are bonded.

Figure 7:
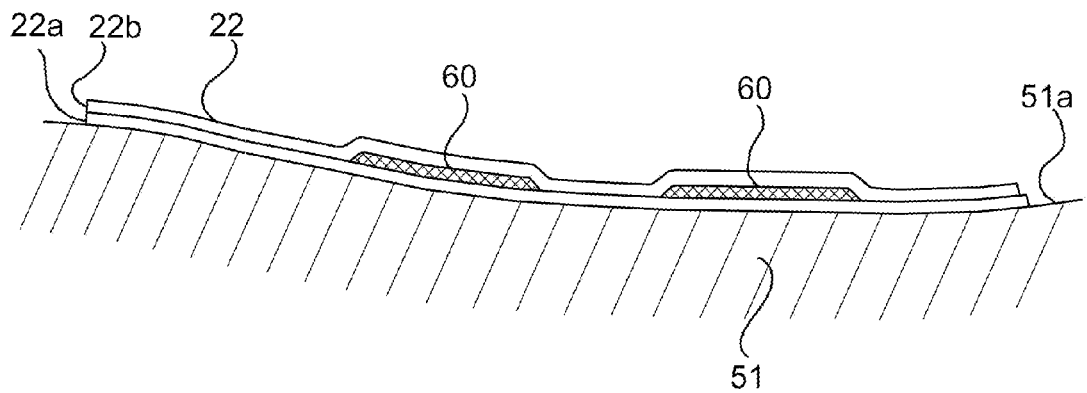
FIG. 7 shows a simplified sectional view of the upper surface skin portion of FIG. 4, in which stiffening elements of the type shown in FIG. 5 are inserted.

Having been stabilized in this way, the stiffening elements 60 are then cut and trimmed so that they can be transferred to the insides of the upper surface skin portion 22 and the lower surface skin portion 21 as shown in FIGS. 1 and 7, which relate to the upper surface skin portion 22 only. For this purpose, a first fraction 22a of preimpregnated material layers is laid on the mould half 51; the stiffening elements 60 are then applied in the predetermined positions; and finally the lay-up of the preimpregnated material layers is completed by applying a second fraction 22b of these layers so as to cover the stiffening elements 60. The procedure for the lower surface skin portion 21 is identical.

The lower surface skin portion 21 and upper surface skin portion 22 produced for use in the process stages described above are fresh; in other words the resin matrix of their constituent preimpregnated material is not yet polymerized.

During the lay-up of the layers of the skin portions 21 and 22, it is possible to apply monitoring sensors such as those described in WO 95/24614 and U.S. Pat. No. 5,493,390 between the different layers. Thus it is possible to insert optical fibre sensors with Bragg gratings which are embedded in critical areas of the structure, for the purpose of monitoring the intrinsic deformation of the structure 10 during structural testing. With this validation, therefore, the sensors can be used for monitoring the structural condition throughout the service life of the structure, and can indicate a fatigue condition to allow possible preventive maintenance and/or repair operations.

Figure 8:
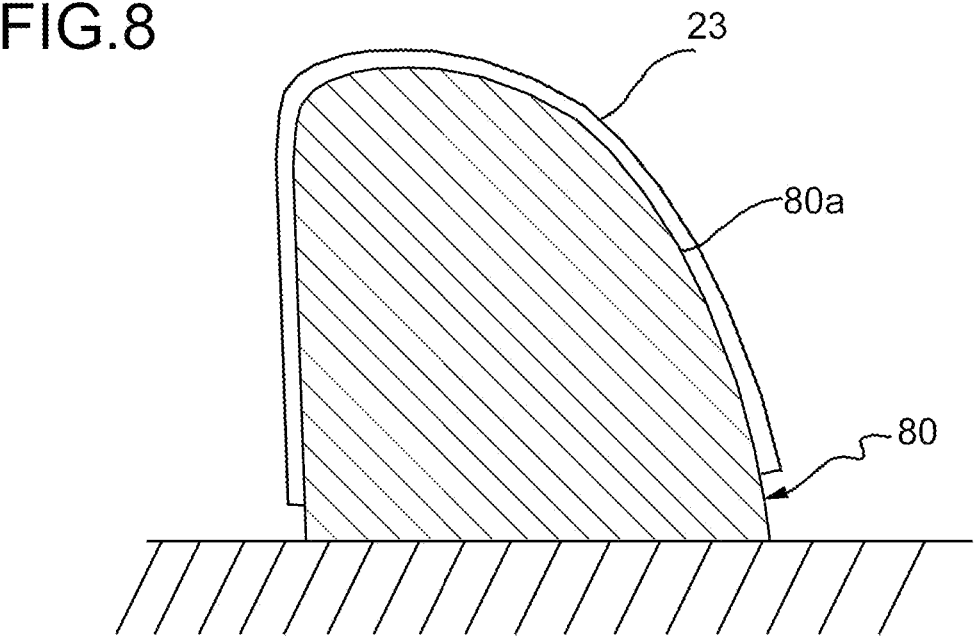
FIG. 8 shows a simplified sectional view of the leading edge of the structure of FIG. 1, laid on a shaped apparatus.

FIG. 8 shows a shaped apparatus 80 for the manufacture of the leading edge skin portion 23. This apparatus 80 is shaped so as to impart the desired profile to the material which is laid on it, and therefore has a mould surface 80a which reproduces the desired shape to be imparted to the leading edge skin portion 23.

The shaped apparatus 80, and specifically the mould surface 80a, is prepared in a conventional way to be used, in a clean room in controlled temperature and pressure conditions, for the deposition in succession (laying-up) of a plurality of layers of preimpregnated material in order to produce a stratified structure forming the leading edge skin portion 23. Stages of compaction, using a vacuum bag, can be carried out between the stages of deposition of the layers. The leading edge skin portion 23 produced for use in the stages of the process described above is fresh; in other words the resin matrix of its constituent preimpregnated material is not yet polymerized.

Figure 9:
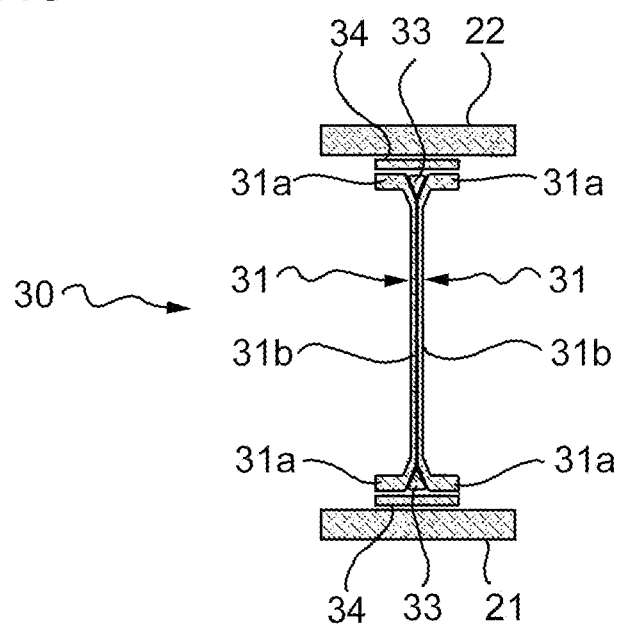
FIG. 9 shows a sectional detail view of a spar of the structure of FIG. 1.

FIG. 9 is a sectional view of a detail of one of the spars of the structure 10 of FIG. 1. This spar 30 comprises two half-spars 31 formed by two C-section elements joined together at their central webs 31b, with their end fins 31a bent so as to form a double-T structure in combination. Fillers 33 with a triangular cross section are applied along the two longitudinal recesses located in the connecting areas between the webs and the fins of the sections. Finally, cover strips 34 are applied to the ends of the spar section to cover the recesses in which the fillers 33 have previously been positioned.

FIGS. 10a to 10d show the stages of an example of a process for manufacturing the spar 30 of a conventional type. The type of process used for producing the spar and the specific shape of the spar are not essential features of the invention. The essential feature is, however, that the spars 30 produced for use in the stages of the aforesaid process must be fresh; in other words, the resin matrix of their constituent preimpregnated material must not yet be polymerized.

Figure 10A:
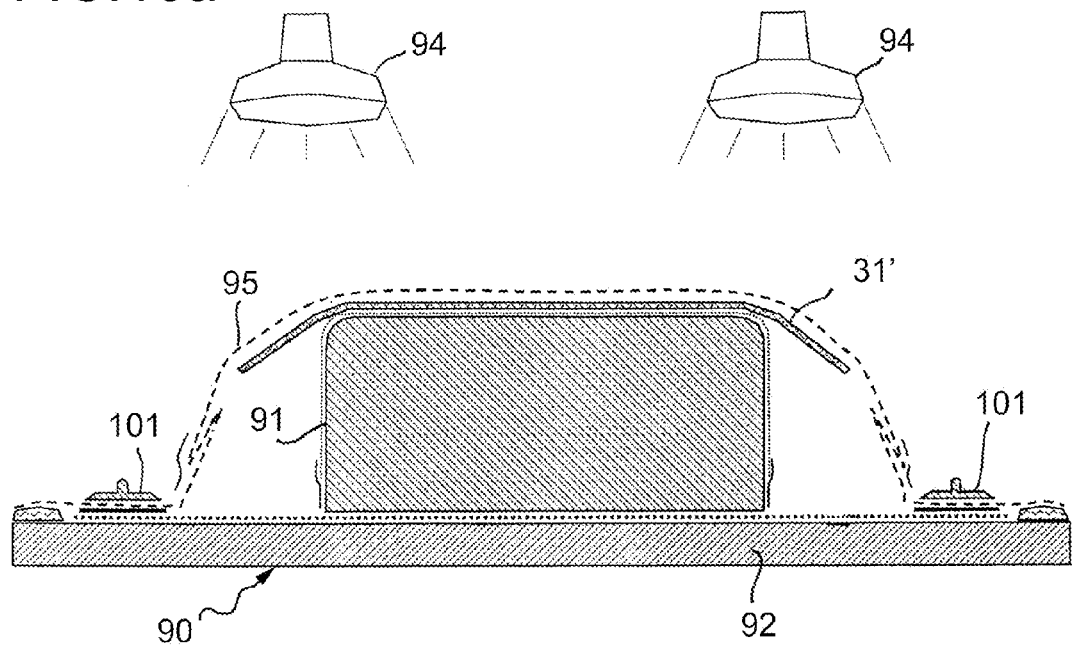
FIGS. 10a to 10d show stages of the manufacture of the spar of FIG. 9.

FIG. 10a shows a stage of the process in which a C-section half-spar 31 is produced from a lamina of completely flat preimpregnated material 31'. A forming apparatus indicated as a whole by 90 comprises an elongate mandrel 91 with an overall rectangular cross section positioned with one side lying along a rigid flat plate 92. The lamina of preimpregnated material 31' is initially laid on the mandrel 91, which is introduced into a thermoforming apparatus provided with infrared lamps 94 which heat the lamina to a temperature such that the layers of preimpregnated material slide with respect to each other during the operation of bending the flanges (in other words the end fins) without forming wrinkles. When the desired temperature is reached, a vacuum is applied, using the vacuum application valve 101 (FIG. 10a). A vacuum bag 95 applied to the lamina 31' and sealed on to the plate 92 is then shrunk downwards by the application of the vacuum, thus forcing the "fins" of the lamina 31' to bend downwards, reproducing the shape of the mandrel 91. In this way the C-shape is imparted to each initially flat lamina 31' by thermoforming.

Figure 10B:
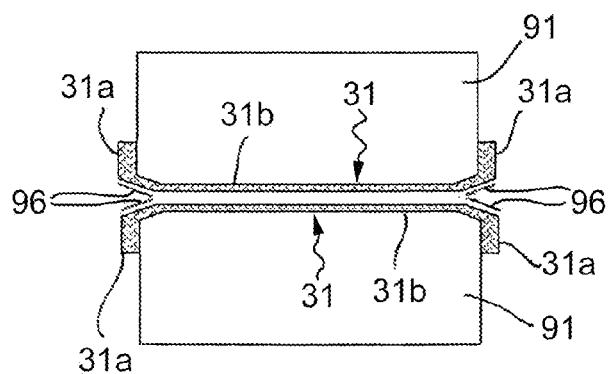

On completion of the hot forming of two fresh C-shaped half-spars 31, a strip of adhesive 96 is applied in the areas of connection between the webs 31b and the fins 31a of the half-spars, along the whole length of the half-spars. The two half-spars are then superimposed on each other as shown in FIG. 10b.

Figure 10C:
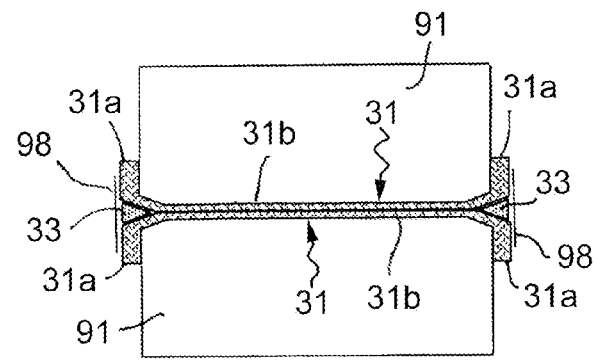

As shown in FIG. 10c, the fillers 33, formed from a tape of preimpregnated material, are applied along the two longitudinal recesses located in the areas of connection between the webs and the fins of the half-spars. A layer of adhesive 98 is then applied to cover each filler 33.

Figure 10D:
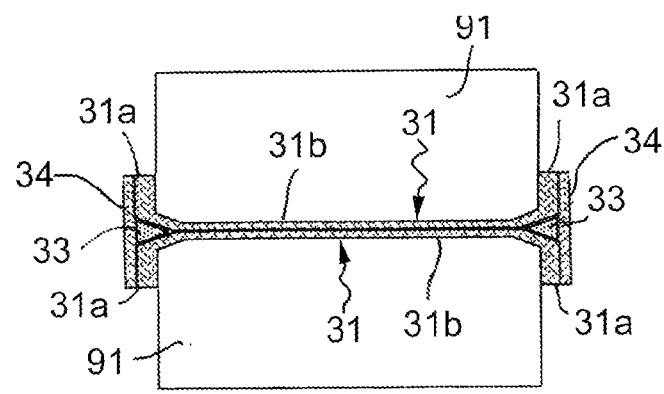

The cover strips 34, formed from laminates of preimpregnated material, are then applied, as shown in FIG. 10d. Finally, the spar 30 is compacted, using a vacuum bag.

The wedgelike body 40 of light expanded plastics material shown in FIG. 2 is machined separately. Preferably, the wedgelike body 40 is made from closed-cell foam, for example Rohacell® 51 WF, made by Degussa GmbH, Düsseldorf, Germany. The wedgelike body 40 is machined so as to have a height greater than the nominal dimension which it has inside the finished structure, for the reasons which are explained below.

Figure 12:
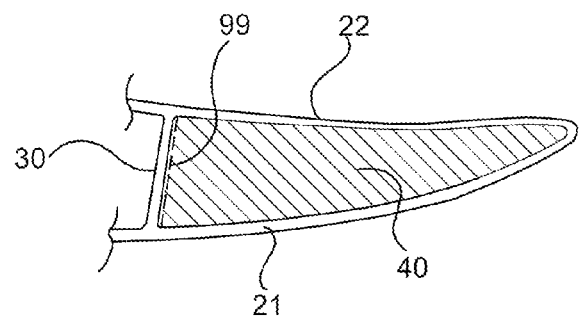
FIG. 12 shows a partial schematic sectional view of the trailing edge area of the structure of FIG. 1.

The fresh components of the structure 10 produced in the stages of the process described above are then assembled on the first mould half 51 on which the upper surface skin portion 22 is already present. In particular, the leading edge skin portion 23 is transferred to a supporting member 100 positioned on one side of the upper surface skin portion 22, so as to connect the latter to the leading edge skin portion 23. The spars 30 are also positioned with their corresponding support members 100 on to which they have previously been transferred, and, on the opposite side, the wedgelike body 40 is also positioned and is fixed to the upper surface skin portion 22 by means of a film of adhesive 99, as shown in FIG. 12. The positioning of the support members 100 with the leading edge skin portion 23 and with the spars 30 is controlled by end bosses (not shown) which are fixed to the support members 100 and which are engaged in reference racks (not shown) fixed to the mould 51. The support members 100 serve to support the as yet unpolymerized preimpregnated material of the components which they support. These support members 100 are covered with tubular vacuum bags based on the teachings of patent EP 0 582 160.

When the aforesaid components have been positioned on the first mould half 51, the second mould half 52 is turned over and positioned on the first mould half 51 so as to position the fresh lower surface skin portion 21 on the spars 30 and on the support members 100, so as to produce a fresh wing structure 10 in the configuration shown in FIG. 13.

Additionally, the positioning of the second mould half 52 causes the lower surface skin portion 21 to be connected to the leading edge skin portion 23, and causes part of the lower surface skin portion 21 to be laid on the wedgelike body 40, which has already been positioned on the upper surface skin portion 22. In this way the outer skin 20 of the structure 10 is completed.

Figure 11:
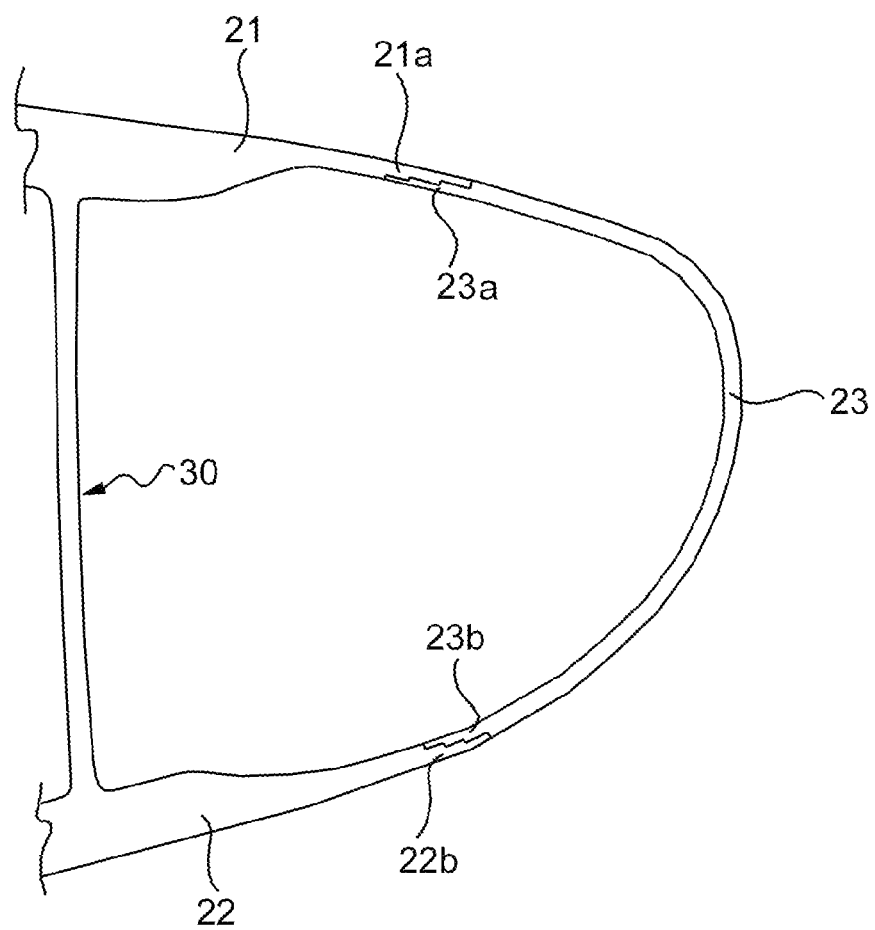
FIG. 11 shows a partial sectional view, on an enlarged scale, of the leading edge area of the structure of FIG. 1.

To ensure the continuity of the outer skin 20, it is preferably to use a connection with staggered joints for its parts. In relation to this, FIG. 11 shows the part of the structure 10 at the leading edge. As can be seen, the layers of the leading edge skin portion 23 are superimposed in such a way that they do not terminate at the same point, but at different points, thus forming edges 23a and 23b with stepped profiles. In the same way, the layers of the upper surface skin portion 22 and lower surface skin portion 21 are superimposed in such a way that they form edges 21a and 22b having stepped profiles which are complementary to the edges 23a and 23b respectively of the leading edge skin portion 23 to which they are connected.

Figure 14:
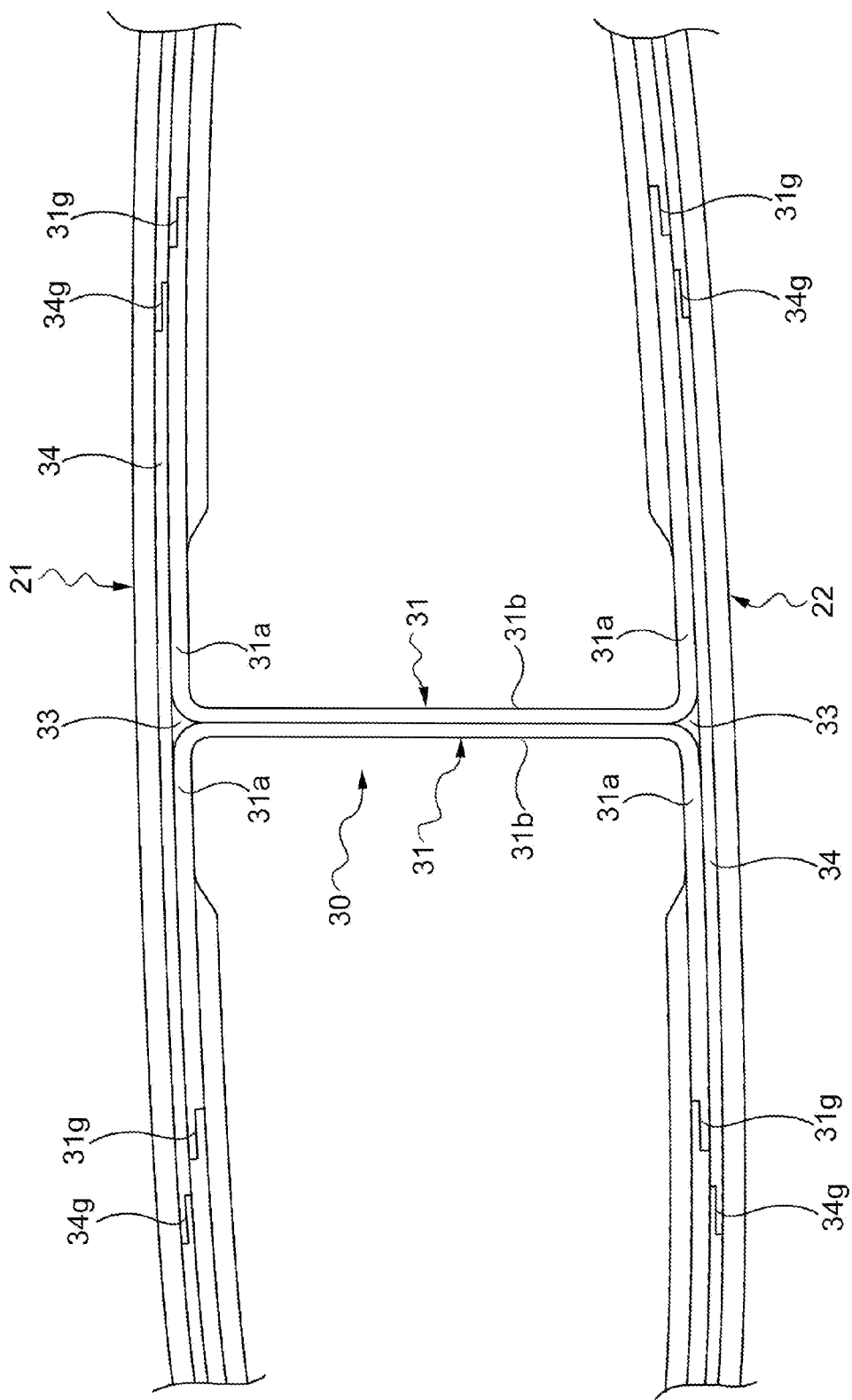
FIG. 14 shows a partial sectional view, on an enlarged scale, of a segment of the structure of FIG. 1, taken along the line XIV-XIV.

The staggered joint connection is also used to interconnect the spars 30 by means of their end fins 31 and cover strips 34, as shown in FIG. 14. To avoid discontinuities in the joint areas between one spar 30 and another, staggered joints 31g and 34g are also used here.

As mentioned above, the wedgelike body 40 is interposed between the lower surface skin portion 21 and the upper surface skin portion 22.

As explained above, the wedgelike body 40 has a vertical thickness which is greater than its nominal dimension. This causes the trailing edge of the structure 10 to be compacted by mutual compression due to the closing force of the shell apparatus 50, between the unpolymerized layers of the upper surface skin portion 22 and the lower surface skin portion 21 and the wedgelike body 40. This body can exert the necessary reaction pressure on the skins only if it is crushed and brought to the nominal dimension, starting from the dimension which was increased in a calibrated way.

For this purpose, the wedgelike body 40 is machined with an offset equal to a percentage of the thickness of the polymerized layers, and its height is therefore increased by an amount which varies according to the thickness of the lower surface skin portion 21 and the upper surface skin portion 22. This percentage increase has been determined experimentally by the inventors, using the materials specified above, and has been found to be equal to approximately 20%, being inherently dependent on the factor of increase of the unpolymerized layers with respect to the thickness of the polymerized layers.

The fresh structure 10 produced in the aforementioned stages and placed in the shell apparatus 50 is then introduced into an autoclave (not shown) for a final polymerization cycle for the consolidation of the lower surface skin portion 21, the upper surface skin portion 22, the leading edge skin portion 23 and the spars 30 and the simultaneous curing (co-curing) of the various components.

Inside the autoclave, in the largest part of the structure 10, indicated by I, the pressure to be exerted on the fresh components is applied by means of the tubular vacuum bags made according to the teachings of patent EP 0 582 160, while in part II the pressure is exerted by reaction to the crushing of the wedgelike body 40, as explained above. If the preimpregnated material is carbon/resin, the maximum pressure of the polymerization cycle is 6 bars, while the maximum temperature is 180° C.

The invention claimed is:

1. A method of manufacturing a wing structure, comprising the following stages:
    laying in succession on a first mould half a plurality of layers of preimpregnated material to form a first fresh skin of said wing structure;
    laying in succession on a second mould half a plurality of layers of preimpregnated material to form a second fresh skin of said wing structure;
    forming a plurality of fresh spars, each of said spars comprising a plurality of layers of preimpregnated material;
    positioning said fresh spars in a coordinated way on the first fresh skin, using removable support members on which the spars have previously been positioned;
    turning over the second mould half and placing the second mould half on the first mould half so as to position said second fresh skin on said spars and said support means, so as to produce a fresh wing structure; and
    subjecting said fresh wing structure to a polymerization cycle, using a vacuum bag,
    laying in succession on a shaped apparatus a plurality of layers of preimpregnated material to form a fresh leading edge skin of said wing structure;
    forming a wedgelike body of light expanded plastics material, said wedgelike body being designed to be interposed between said first and second skins at the trailing edge of said wing structure;
    on completion of the stage of placing the fresh spars on the first fresh skin, positioning said wedgelike body on the first fresh skin, in such a way that, when said second fresh skin is positioned on said spars, said fresh leading edge skin is connected to said first and second fresh skins, and said wedgelike body is interposed between said first and second fresh skins;
    in such a way as to obtain, at the end of the polymerization cycle, a wing structure with a controlled integral profile, free of mechanical connecting members;
    wherein the wedgelike body is machined so as to have a height greater than a nominal dimension which the wedgelike body has inside said structure at the end of polymerization; and
    wherein a closing force of the first and second mould halves compresses the wedgelike body between the first and second fresh skins to reach said nominal dimension.

2. A method according to claim 1, wherein said wedgelike body is made from closed-cell foam.

3. A method according to claim 2, wherein said wedgelike body comprises polymethacrylimide foam.

4. A method according to claim 1, wherein the wedgelike body has a height approximately 20% greater than said nominal dimension.

* * * * *